Oct. 3, 1944.　　　E. A. LINK, JR., ET AL　　　2,359,484
NAVIGATION INSTRUMENT
Filed April 5, 1941　　　3 Sheets-Sheet 1

EDWIN A. LINK, JR.
HAROLD A. MARSH
INVENTORS

BY Charles G. Randall
ATTORNEY.

Oct. 3, 1944. E. A. LINK, JR., ET AL 2,359,484
NAVIGATION INSTRUMENT
Filed April 5, 1941 — 3 Sheets-Sheet 2

EDWIN A. LINK, JR.
HAROLD A. MARSH
INVENTORS

BY Charles G. Randall
ATTORNEY.

Oct. 3, 1944.　　E. A. LINK, JR., ET AL　　2,359,484
NAVIGATION INSTRUMENT
Filed April 5, 1941　　　3 Sheets-Sheet 3

EDWIN A. LINK, JR.
HAROLD A. MARSH
INVENTORS

BY Charles G. Randall
ATTORNEY.

Patented Oct. 3, 1944

2,359,484

UNITED STATES PATENT OFFICE 2,359,484

NAVIGATION INSTRUMENT

Edwin A. Link, Jr., and Harold A. Marsh, Binghamton, N. Y., assignors to Link Aviation Devices, Inc., Binghamton, N. Y., a corporation of New York Application April 5, 1941, Serial No. 387,074

7 Claims. (Cl. 88—2.4)

Our invention relates to navigation instruments, and in particular, to sextants, for use in aeronautical navigation.

The sextants known to the previous art for use in high speed aircraft have all had in common several disadvantages. It is the general object of this invention to eliminate these undesired features.

A specific fault characterizing all previous instruments of this type is that they were not adapted to be held in sighting position with sufficient ease on the part of the operator to enable him to take the required number of sightings without great fatigue. It is one object of our invention to develop an instrument that may be comfortably held without unnecessary muscular strain—an instrument that can therefore be read more quickly and, hence, more accurately. Such an instrument must be light, compact, and readily graspable. This we aim to provide.

Also, all previous devices of this type were built without regard to future servicing of the instrument. Sextants used in aeronautical navigation must be provided with artificial light. The lighting systems previously available were so fallible that aviators on long nocturnal flights had to carry at least one extra sextant. This was necessary because of frequent short-circuiting in the extensive wiring systems of the old instruments, and the failure of the lighting systems to work because their low voltages could not overcome the frequent slight corrosions. When these difficulties appeared in the old instruments, they could be remedied only by long, time-consuming operations. It is, therefore, a further object of our invention to produce an instrument wherein these difficulties are much less likely to occur; and further, should they occur, an instantaneous but certain remedy be available.

In sextants to be used in the air, the most general substitute for the horizon is a bubble in a liquid, both bubble and liquid being encased in a suitable container, and the container held in appropriate position by other parts of the instrument. Unfortunately, there is no known method of manufacturing a bubble unit so that said unit will certainly maintain correct position with respect to the rest of the instrument during the life of the instrument, and, likewise, there is no guarantee that said bubble unit itself will remain in perfect condition. In every type of aerial sextant known before our invention, should either of these conditions occur, the instrument had to be substantially taken apart, usually at the factory, to return it to operative condition.

Furthermore, because of the speed of today's airplanes, speed in taking bearings is of the essence. In smooth air, an active bubble will save time; in rougher air, a slower bubble is better. In addition, under some circumstances a spherical bubble is superior, while at other times a tubular bubble is more effective.

Because of the service problem as respects bubbles, and because of the desirability of being able to use different types of bubbles in one sextant, it is a further object of our invention to provide a sextant in which one bubble unit may be replaced quickly and in correct operative position by another such unit.

A sextant is a precision instrument. One-thousandth of an inch error in the location of certain parts, such as the bubble, may give a reading of two or more minutes in error, which error will cause the navigator to believe he is two miles or more from where he actually is. It will therefore be appreciated that an instrument which will more accurately retain its factory adjusted position is highly desirable. The multiple-piece casings of prior art instruments, because of the inevitable movements between the parts thereof, were highly unsatisfactory for aeronautical use. We correct this shortcoming by another feature of our invention—the single piece casing.

A particular and novel feature of the invention is the mechanism which is provided for setting the index arm or alidade that is connected to the indexing mirror. This setting means includes a manually rotatable roller which moves in a trackway and is so mounted that adjustment can be readily made to compensate for wear of the roller or its trackway.

These and other features of the invention including certain details of construction and combinations of parts will be described as embodied in an illustrative machine and pointed out in the appended claims.

Referring to the accompanying drawings.

Figure 1:
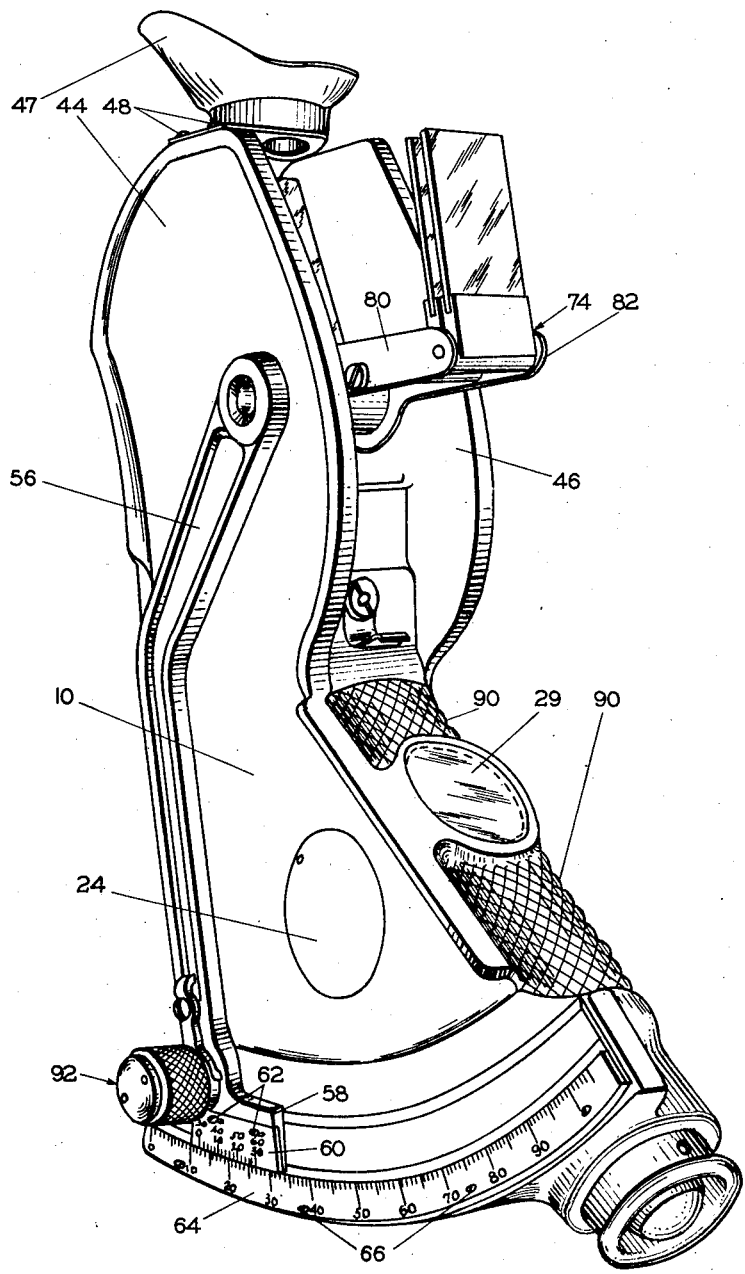
Fig. 1 shows a side elevation in perspective of the complete instrument.

The above objects of our invention are attained in the preferred embodiment of our invention by our one-piece casing 10 which has at one end a housing of the general outline of a right triangle. (See Fig. 2.) Within said housing there are three chambers, easily accessible from the exterior of said casing, and each nicely adapted to receive and hold in operative position a functioning unit which in turn is nicely adapted to fit into the appropriate chamber. There are three such units: a lighting unit 14, a bubble unit 24, and an image reflecting unit 30. Any one of these three units may be fitted into its chamber with ease; said chamber will hold it in correct operative position; and said unit may be easily removed and a substitute unit inserted in its place.

The bottom of the triangular housing, i. e., the side opposite the hypotenuse (see Fig. 2)—the side along which lies the image reflecting unit 30—may be considered a base, said base being adapted to rest nicely on the butt of the left hand when the left fore-arm is approximately in a vertical position. The weight of the sextant during observation will, therefore, rest directly above the wrist—the least tiring of positions. When so placed in the hand, the sextant by itself assumes a position very close to that necessary to free the bubble from the sides of its container. By slight turnings of the wrist, the bubble is quickly set free, and the observer is ready to bring the heavenly body into coincidence with the reflected image of the bubble by manipulation of the index mirror which is moved by the right hand. So by the peculiar arrangement of the parts of our instrument, a quick easy observation is possible. As before stated, this is of paramount importance in a speeding plane.

A further advantage results from the above arrangement. When held in operative position, the fingers of the left hand may be used to shade the peep glass 29 should the light entering therethrough be too intense.

Thus the left hand has only to hold the instrument and to shade the peep glass. The only motion of the left hand is on a universal joint—the wrist. This eliminates any use of the left hand that has a tendency to move the instrument out of correct observing position—a tendency very much present when the left hand has to perform other duties, as a turning of a knob, which is usually the case in other sextants.

Figures 2, 3:
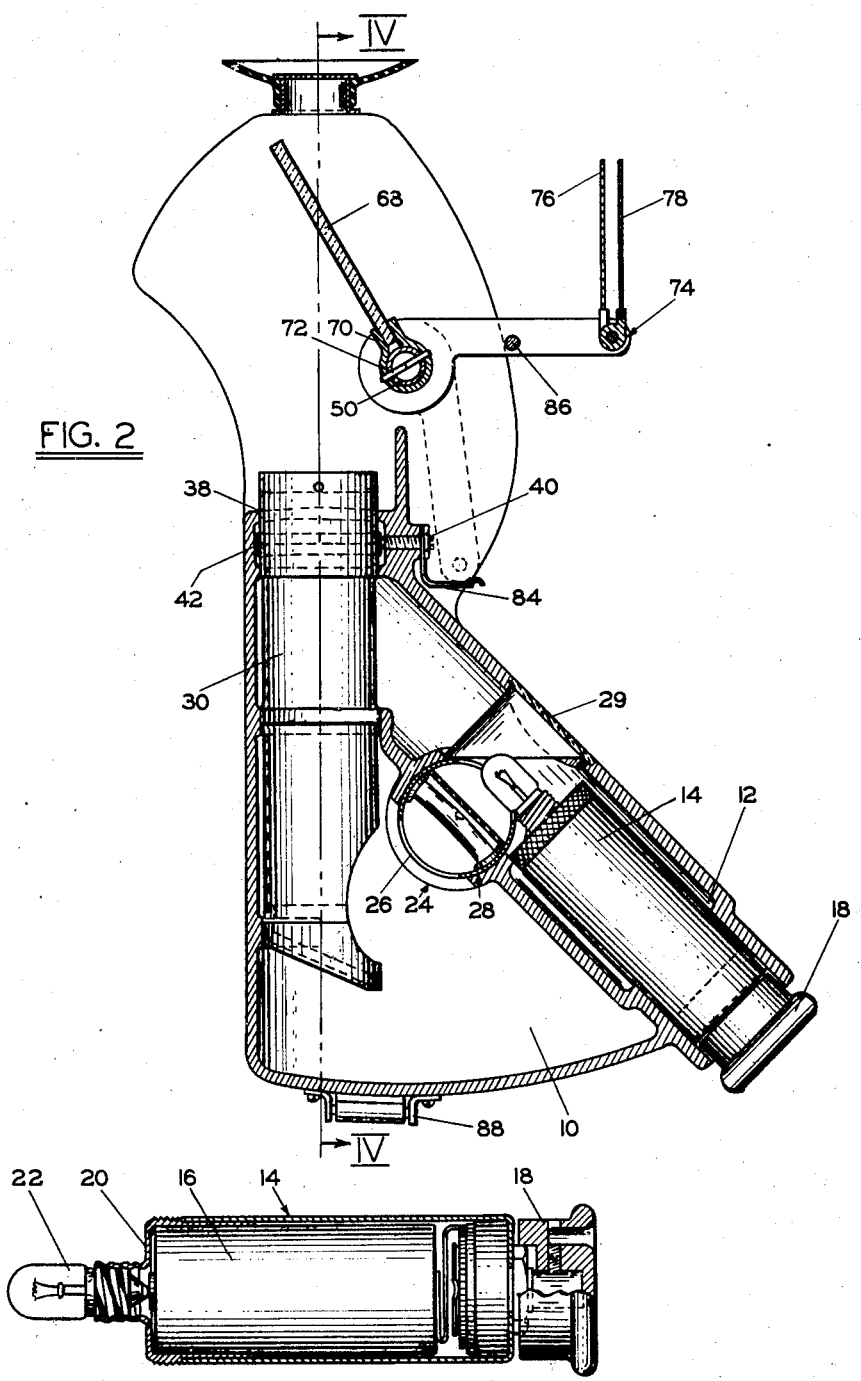
Fig. 2 represents a vertical section of the instrument as shown in Fig. 1.
Fig. 3 is a side elevation partly in section of the electric lamp unit for illuminating the bubble.

More specifically, our one-piece casing 10 is preferably made of cast metal and is provided at its lower end (Fig. 2) with a generally cylindrical chamber 12 for receiving an electric lamp unit 14 which is generally complemental to its chamber. As seen in Figs. 2 and 3, the electric lamp unit 14 includes a dry cell battery 16, a combined rheostat and switch control 18 which extends outside of the casing 10, a casing and socket assembly 20, and an electric lamp 22. While the electric lamp unit 14 is adapted to be frictionally held within the chamber 12, light leaf springs may be provided on the unit for this purpose.

A bubble chamber unit 24 is mounted in one side of the casing 10 so as to be illuminated by the lamp 22. The bubble unit includes a circular casing 26 which snugly fits a corresponding chamber 28 in the one-piece casing 10. In this instance also, light leaf springs attached to the bubble unit may be used for retaining purposes. A peep glass 29 is suitably mounted on the upper side of the integral casing 10 for observation of the lamp 22 and bubble unit 24, and illumination of the bubble chamber in daylight.

Figure 5:
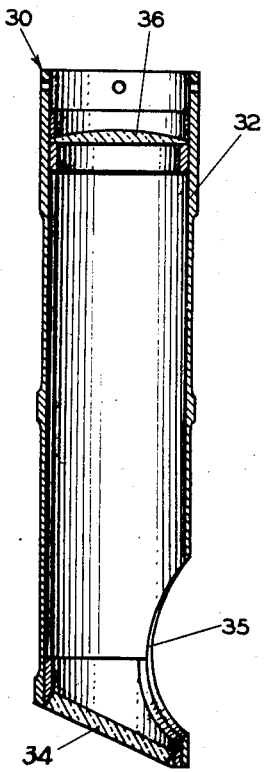
Fig. 5 shows a longitudinal section of the image reflecting unit.
Figure 4:
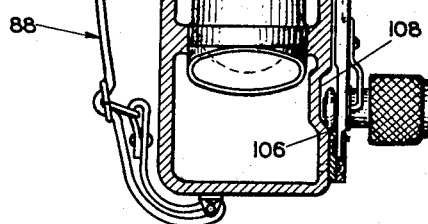
Fig. 4 shows a further vertical section of the complete instrument taken on line IV—IV of Fig. 2.

There is a third readily removable component in the form of an image reflecting unit 30 which comprises a tubular casing 32 having at its lower end, as seen in Figs. 2 and 5, an angularly arranged mirror 34 exposed through a side opening 35, and at its upper end, a suitably mounted magnifying lens 36. The casing 10 is provided with a downwardly extending chamber or opening 38 for receiving and supporting the image reflecting unit 30, and a retaining screw 40 is threaded through an adjacent wall of the casing 10 in a position to engage a bearing band 42 which encircles the tubular casing 32, thus securely retaining the image reflecting unit in proper position. It is to be observed that the image reflecting unit and its angularly mounted mirror 34 are so arranged as to catch the image of the bubble and to direct it through magnifying lens 36 and between a pair of spaced sides or parallel furcations 44 and 46 of the casing 10 to an apertured eyepiece 47. Figs. 1 and 4 show the manner of mounting the eyepiece 47 by means of screws 48 secured to the extending side or furcation 46, and in axial alignment with the reflected path of the bubble image.

The next component to be considered is mirror indexing assembly 49, attention being directed to Fig. 2. A hollow or tubular shaft 50 is rotatably supported in a pair of opposed casing bosses 52 and 54 (Fig. 4) and has fixed to its end which extends outside of the casing 10, an index arm or alidade 56 that hangs downwardly and has the angular shape indicated best by Fig. 1. At its lower extremity, the index arm 56 is provided with an enlarged arcuate lower end 58 shaped or recessed to receive a vernier scale 60 mounted adjustably thereon by means of attaching screws 62, 62. On the same side of the lower and arcuate end of the casing 10, there is mounted a graduated arc or limb 64, as by attaching screws 66, 66. The engaging surfaces of the vernier scale 60 and graduated arc 64 are complementarily shaped and closely fitted for the required accuracy of relative movement. An optical mirror 68 is mounted between the upstanding arms or sides 44 and 46 of the casing 10 through the medium of an open sleeve 70 which is clamped to its mirror edge and secured to the limb shaft 50 by means of a pin 72 passing through both.

A sunshade unit 74 comprising selectively usable filter glasses 76 and 78 is independently pivoted on shaft 50 by means of a pair of arms 80 and 82 independently rotatable with respect to the optical mirror 68. Note is now made of a spring clip 84 secured on the outside of the casing 10 by the retaining screw 40 and arranged to receive the pivoted ends of the filter glasses 76 and 78 to retain the sunshade unit 74 in the inoperative position shown in dotted lines in Fig. 2. A rod 86 extends between the pair of arms 80, 82 intermediate their lengths and serves as a stop for the filter glasses 76 and 78 to prevent undesirable inward movement.

Those familiar with the use of such instruments will understand that the function of the optical indexing mirror 68 is to bring into coincidence the image of the bubble 24, as reflected by the mirror 34, and the image of the celestial body being observed. For observations on the moon and sun the observer looks through the eyepiece 47, and, therefore, he brings into coincidence the image of the bubble 24 as reflected by the mirror 34 and the image of the moon or sun as reflected by the index mirror 68. But for observations on the stars, the observer places his eye to the left of the furcations 44 and 46 as seen in Figs. 1 and 2 and brings into coincidence the image of the star as seen directly through the index mirror 68 and the image of the bubble 24 as reflected by the mirror 34.

It will be observed that the sighting plane of the sextant as defined by motion of the index mirror 68 is the same as the one in which lie the lighting means 14, the bubble or level determining means 24, and the image reflecting means 30. Of great importance to the balancing of the sextant, when held by the hand of an observer in sighting position, is the arrangement of the base portion of the housing 10, which base portion comprises the side opposite the hypotenuse of the right angle housing, in the sighting plane of the instrument along with the components mentioned above. That is to say, this extended base portion has its longitudinal axis in the same common plane.

Fig. 4 illustrates a conventional, adjustable handle strap 88 which extends along the opposite side of the casing 10 from the index arm 56 to receive the hand and permit the fingers thereof to extend over the roughened or serrated grasping surfaces 90, 90 on the upper side of casing 10, and separated by the peep glass 29.

Figure 6:
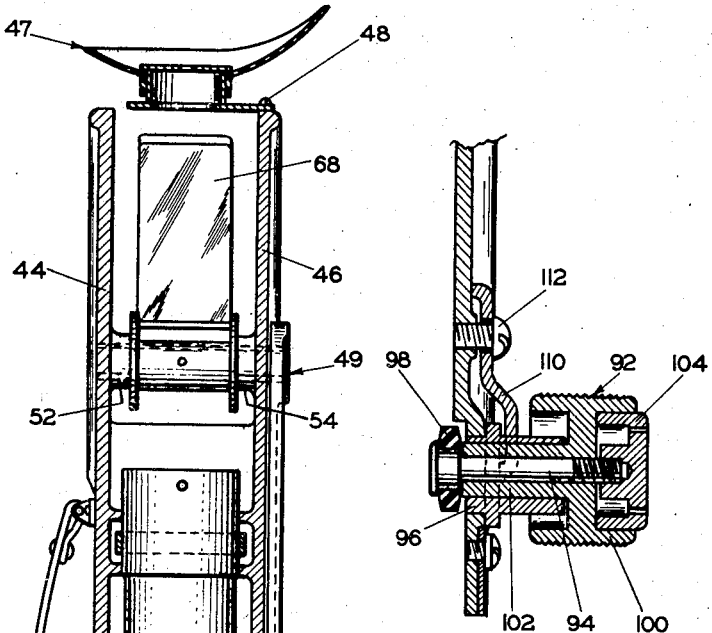
Fig. 6 is an enlarged fragmentary section illustrating the vernier and the setting means for the index arm.

Attention is now directed to the setting means 92 for the index arm 56. Figs. 1, 4 and 6 show this means as comprising a shaft 94 threaded on its outer end and extending through a shouldered bushing 96 which is eccentrically bored. A roller 98 of hard non-metallic composition is secured to the inner end of shaft 94, as viewed in Fig. 4, for a purpose to be described. The shaft 94 carries also a concentric hand knob 100 having a sleeve 102 formed on its inner end and extending through the bushing 96 and over the shaft 94. The roller 98 turns positively with the shaft 94 on which it is mounted, and a threaded cap 104 fits on the outer end of shaft 94 to clamp it to the knob 100. A trackway or groove 106 corresponding in shape to the profile of the roller 98 is formed by the out-turned edge of the graduated arc 64 and an opposite arcuate indented portion 108 at the bottom of casing 10.

It will be apparent that rotation of the eccentrically bored bushing 96 within the end of index arm 56 will shift the axis of rotation of the roller shaft 94 either up or down as desired. In order to maintain the required adjustment, a bifurcated spring plate 110 straddles the bushing 96 and is secured to arm 56 a short distance thereabove by means of a clamping screw 112.

This unique mechanical assembly of the setting means 92 for index arm 56 permits ready adjustment to accommodate wear of either the roller 98 or trackway 106.

Where the expressions "assembly" and "unit assembly" are used in the foregoing specification and appended claims, they are intended to refer respectively to a component of the instrument such as the parts associated with the mirror indexing means and those other components, such as the lighting means 14, which are completely assembled apart from the instrument and are intended for easy insertion as a unit in one of its chambers, and replacement as required.

Although the invention has been described as embodied in a particular instrument having certain details of construction, it should be understood that the invention is not limited in the scope of its application to the instrument which has been shown and described.

What we claim as new and desire to secure by Letters Patent of the United States is:

1. A sextant comprising a housing having opposite faces of the general outline of a right triangle; a spaced pair of furcations extending approximately as continuations of the opposite faces of the housing; an electric lamp unit assembly extending within the casing along its hypotenuse boundary; an image reflecting unit assembly secured within the housing and extending along the boundary opposite the hypotenuse; and a mirror indexing assembly; said housing having an external base portion opposite its hypotenuse, said base portion being so arranged that said sextant is balanced for holding the same in sighting position when the base portion is resting on the butt of the hand of the observer.

2. In an instrument of the character described, the combination comprising a casing having a plurality of distinct chambers; a bubble unit assembly removably mounted in one of the chambers of the casing; an electric lamp unit assembly including a housing holding a source of current and a lamp removably mounted in another chamber of the casing and constructed and arranged to illuminate the bubble of the bubble unit assembly; an image reflecting unit assembly including a frame member holding a mirror and a collimating lens, said image reflecting unit assembly being retained in another chamber of the casing and its mirror arranged to catch the bubble image and reflect it through said collimating lens; an indexing assembly pivotally mounted within the casing and including an optical mirror arranged to intercept the reflected bubble image and light from an object external of the casing, and indexing means operatively connected to said index mirror for indicating the position of said index mirror.

3. A sextant comprising a housing having a base portion arranged to rest upon and extend across the butt of one of the observer's hands when held in sighting position, said housing having two sides attached to said base portion and extending upwardly when the instrument is held in sighting position, a plurality of chambers inside the housing formed by said base portion and sides, one of said chambers extending transversely of said sextant and opening through one of the sides thereof, a readily removable bubble unit assembly in said chamber opening through said side, a readily removable lighting unit assembly including a housing holding a battery and a lamp in another of said chambers and constructed and arranged to illuminate the bubble of the bubble unit assembly, and image reflecting means including a mirror and a collimating lens in said housing, an indexing mirror pivotally mounted within the instrument, said bubble unit assembly, lighting unit assembly, image reflecting means and indexing mirror all being positioned to be intercepted by a single plane through said base portion.

4. In an instrument of the character described, the combination comprising a one-piece casing having a plurality of distinct chambers; a bubble unit assembly frictionally retained in one of the chambers of the casing; an electric lamp unit assembly including a source of current, a lamp, and a switch frictionally retained in another chamber of the casing and constructed and arranged to illuminate the bubble of the bubble unit assembly; an image reflecting unit assembly of tubular shape and including a mirror and a collimating lens, said image reflecting unit assembly being frictionally retained in another chamber of the casing and its mirror arranged to catch the bubble image and reflect it axially thereof; an apertured eyepiece mounted on the casing in axial alignment with the reflected path of the bubble image; an indexing assembly pivotally mounted within the casing and including an optical mirror arranged to intercept the reflected bubble image and light from an object external of the casing, a filter glass, and an index arm moving angularly with the optical mirror and extending along the outside of the casing; and a graduated arc secured to the outside of the casing in a position to cooperate with the free end of the index arm of the indexing assembly.

5. In an instrument of the character described, the combination comprising a housing; an index arm pivotally attached to said housing; an eccentrically bored bushing rotatably mounted within the free end of said index arm; a shaft rotatably disposed within the bushing; a roller fixed to one end of the shaft, said roller being arranged for rolling engagement with a part of said casing; and turning means secured to the other end of said shaft, said roller and said turning means being on opposite sides of the index arm.

6. In an instrument of the character described, the combination comprising a housing; an index arm pivotally attached to said housing; an eccentrically bored bushing rotatably mounted within the free end of said index arm; a shaft rotatably disposed within the bushing; a roller fixed to one end of the shaft, said roller being arranged for rolling engagement with a part of said casing; turning means secured to the other end of said shaft, said roller and said turning means being on opopsite sides of the index arm; and a spring clamp carried by the index and constructed and arranged to engage the bushing and hold it in adjusted position.

7. In an instrument of the character described, the combination comprising a casing; an index arm pivoted to the casing; an eccentrically bored bushing rotatably mounted within the free end of said index arm; a shaft rotatably disposed within the bushing; a roller fixed to one end of the shaft; means for rotating the shaft and roller, said roller and said rotating means being operative on opposite sides of the index arm; and a graduated arc mounted on the casing adjacent the path of the free end of the index arm, said casing and graduated arm having opposed arcuate portions defining a trackway for the roller.

EDWIN A. LINK, Jr.
HAROLD A. MARSH.